Aug. 22, 1933.　　　P. B. WOLVERTON　　　1,923,349

VACUUM BREAKER

Filed July 9, 1932

Inventor:
Percy B. Wolverton
By
Atty.

Patented Aug. 22, 1933

1,923,349

UNITED STATES PATENT OFFICE 1,923,349

VACUUM BREAKER

Percy B. Wolverton, Chicago, Ill., assignor to Julia N. Larson, Chicago, Ill.

Application July 9, 1932. Serial No. 621,547

1 Claim. (Cl. 296—1)

This invention relates to an automobile or other vehicle and more particularly to a device for preventing a vacuum behind the car while it is in motion.

All bodies immersed in a viscous fluid as a liquid or a gas have their movement impeded by that confluent substance. The forward movement of a body in air is hindered by a frictional drag set up by the air along the sides and by the lowered pressure in the wake of the body due to displacement of the air by the movement of the vehicle.

When a body, such as an automobile, having a wall substantially flat at its rear and normal to the path of the travel of the body is forced through the atmosphere, a resisting dynamic air pressure is set up at the forward and forwardly inclined surfaces of the body presented to the air stream, and concurrently a decrease in pressure is produced at the rear of the rear flat side.

It is known that such dynamic pressure can be easily overcome by constructing the moving body to give it a "fair" form, that is, such form that the dynamic pressure of the impulse near the front is counter balanced by that of the reaction of the air as it closes in around the back body portion. Such a body of "fair" form is of stream line proportions, as is a fish or a torpedo. Such a body when moved through the air at ordinary speeds produces little turbulence in its wake indicating density resistance little beyond that of the ideal stream-line body.

Although the modern automobile is designedly constructed of a cuneiform shape to reduce the formation of eddy currents of air, it is not practicable to provide a rear protuberance on the body for the reason that said protuberance would make for unwieldy manipulation and traffic difficulties.

It is an object of the present invention to provide a means to overcome the objectionable space of reduced air pressure in the wake of a moving automobile or other vehicle, and without the employment of a structure to depend into such space.

It is an additional object of the present invention to provide a means intricate to the embodiment of an automobile or other vehicle for deflecting an air stream into the space of reduced air pressure at the rear of the moving body.

It is a further object of the present invention to create in the wake of a moving automobile an air pressure approaching the dynamic air pressure which is upon the front of the vehicle.

It is a further object of the invention to provide a structure in automobile bodies whereby air is drawn into the back of the body when in motion to break the vacuum there.

The means for accomplishing the above object is made apparent in the following description, which is to be read in conjunction with the accompanying single sheet of drawing hereby made a part of this specification.

In the drawing, Figure 1 is an elevation of an automobile in which the invention in one form is employed, the rear parts of the body of such automobile being broken away to show details of structure;

Like reference characters indicate similar parts in the following description and in the drawing.

Figure 1:
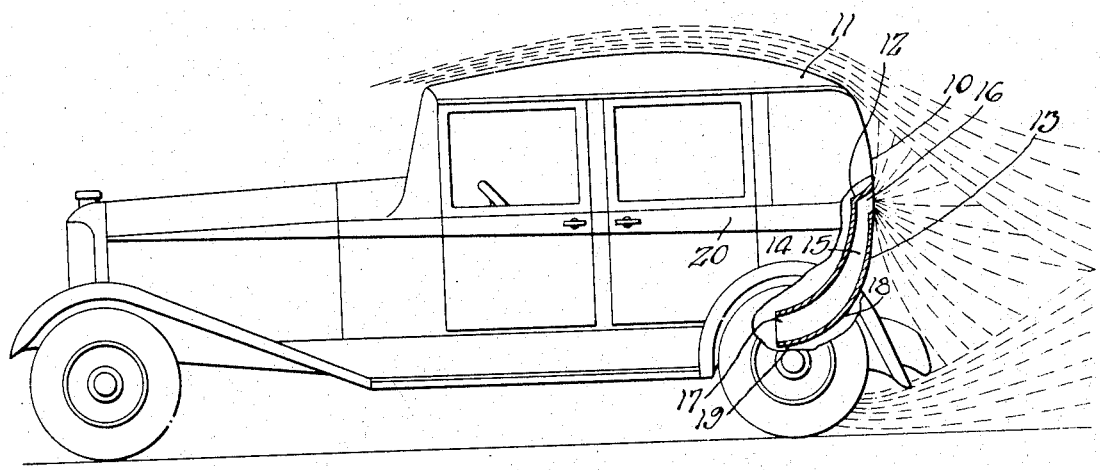
Figure 2:
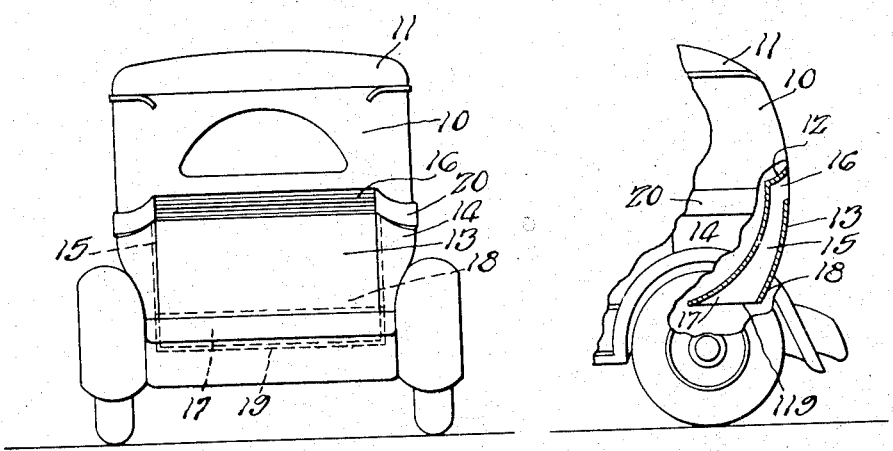
Figure 2 is a rear view of the automobile shown in Figure 1.

Attention is first directed to the rear of the body 10 of the automobile. The top 11 projects backwardly of the body to form an inverted ledge or shoulder 12. The shoulder 12 slopes upwardly and rearwardly from the rear body 10.

A wall 13, formed of customary body material, is fabricated to the sides 14 of the car to extend backwardly of the rear body 10. Intermediate the members 10 and 13 is provided a channel 15 terminating in a generally rectangular opening 16 contiguous to the shoulder 12, the beginning of said channel being in a similar opening 17 adjacent to the bottom edge of the car body.

The back wall 13 is generally in parallelism with the car body, maintaining the channel 15 of a generally constant or fixed cross section. The lower section of the wall 13 preferably has a gently sloping curve 18 to present the extreme end section 19 of the channel below the car body at an angle slightly less than the horizontal.

When a car outfitted as described is moved forwardly, a part or portion of the air stream passing beneath the car body is swept into the opening 17 to be directed upwardly in the channel 15 and out the port or opening. The air thus injected into the normally evacuated space to the rear of the car materially increases the air pressure in such space. With the air pressure behind the car or vehicle approaching the pressure at the front of the car, the dynamic pressure is partially neutralized with the result that additional locomotion power of the vehicle, in proportion to the increased rear air pressure, is available for driving said vehicle forward. Greater speed may be had for the same power, or the automobile may be efficiently operated with less power.

Since the opening 17 is positioned directly to the front of the space occupied by the fuel tank, the air which is conventionally deflected downwardly by such tank is deflected to a position of utility. Since the sections 18 and 19 do not project into an air stream not already bombarding an area normal thereto, namely, the fuel tank, no additional impedance is imparted to the car by the air channel herein described. All of the increased energy obtainable because of the air introduced in the wake of the vehicle, therefore, may be reckoned on the basis of one hundred percent effectiveness.

It will be noted that the embodiment of the invention herein described does not in any way detract from the appearance of the car. The wall 13 and the back of the top 11 are in mutually alined continuation. A channel bead 20 may be formed on the body 14 to further conceal or camouflage the discharge port.

In addition to the air which is forced into the air duct by the pressure of the air forced from the path of the automobile, the vacuum created at the rear of the car as an incident to motion of the vehicle body causes air to be sucked or drawn through the air duct in an endeavor to equalize the pressure at the back of the device with that at the front.

Figure 3:
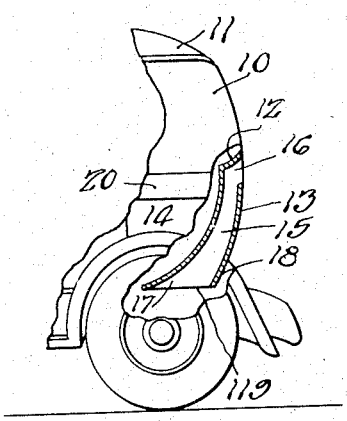
Figure 3 is a sectional detail illustrative of a second form of the invention.

For this reason, it is possible to use a modified form of the invention, such as that shown in Figure 3 in which no deflecting lip is employed upon the air duct. All of the parts of the second form of the invention correspond with the parts shown in the form first described, the only real difference being in the shape of the wall 1, such wall in Figure 3 being designated as 119. The lower end of said wall does not project into the path of onrushing air beneath the underside of the automobile, but the air from such underside of the machine is drawn into the duct by the suction created at the rear of the machine by reason of the vacuum there from the displacement of air during travel of the automobile.

What I claim is new and desire to secure by Letters Patent in these United States is:

In an automobile, a body having a back wall with an opening extending transversely of said body in a plane substantially equidistant from the top and bottom of said body, and walls coacting with said back wall to form a flume to the front of said back wall, said flume extending upwardly from the bottom of said body and having an opening in a position beneath the bottom and transverse of the rear part of said body, the opening in said flume being in the direction of travel of said automobile.

PERCY B. WOLVERTON.